US008732843B2

(12) United States Patent
Kaneko

(10) Patent No.: US 8,732,843 B2
(45) Date of Patent: May 20, 2014

(54) SOFTWARE VALIDITY PERIOD CHANGING APPARATUS, METHOD, AND INSTALLATION PACKAGE

(75) Inventor: Kotaro Kaneko, Osaka (JP)

(73) Assignee: KYOCERA Document Solutions Inc. (JP)

( * ) Notice: Subject to any disclaimer, the term of this patent is extended or adjusted under 35 U.S.C. 154(b) by 497 days.

(21) Appl. No.: 13/110,221

(22) Filed: May 18, 2011

(65) Prior Publication Data

US 2011/0289591 A1 Nov. 24, 2011

(30) Foreign Application Priority Data

May 20, 2010 (JP) ................................. 2010-115866

(51) Int. Cl.
*G06F 21/00* (2013.01)
*G06F 21/57* (2013.01)
*G06F 21/10* (2013.01)
(52) U.S. Cl.
CPC .............. *G06F 21/57* (2013.01); *G06F 21/105* (2013.01); *H04L 2463/103* (2013.01)
USPC .................. 726/26; 726/22; 726/27; 726/28; 726/29; 726/30; 713/2
(58) Field of Classification Search
CPC .................. G06F 21/57; G06F 21/105; G06F 2221/2137; H04L 2463/103
USPC .......................................... 726/22–33; 713/2
See application file for complete search history.

(56) References Cited

U.S. PATENT DOCUMENTS

| 2007/0019621 | A1* | 1/2007 | Perry et al. ..................... 370/352 |
| 2007/0192581 | A1* | 8/2007 | Challener et al. ................. 713/2 |
| 2007/0233602 | A1* | 10/2007 | Zweig et al. ..................... 705/51 |
| 2008/0002221 | A1 | 1/2008 | Fujikura et al. |
| 2010/0042545 | A1* | 2/2010 | Ogg et al. ........................ 705/60 |
| 2010/0048296 | A1* | 2/2010 | Adiraju ............................ 463/29 |

FOREIGN PATENT DOCUMENTS

| JP | 2004-046640 | 2/2004 |
| JP | 2007-257555 | 10/2007 |
| JP | 2008-077364 | 4/2008 |
| JP | 2009-211646 | 9/2009 |

* cited by examiner

*Primary Examiner* — Venkat Perungavoor
*Assistant Examiner* — Amir Mehrmanesh
(74) *Attorney, Agent, or Firm* — McDonnell Boehnen Hulbert & Berghoff LLP

(57) ABSTRACT

A software validity period changing apparatus includes a password information storage unit, an input device, an authentication unit, and a validity period changing unit. The authentication unit calculates a first hash value of the password stored in the password information storage unit, calculates a second hash value of a password input via the input device, and determines whether the first hash value matches the second hash value. The validity period changing unit decompresses an installation package into components, the installation package including a validity period and version information on each of the components, detects a position of the validity period if it is determined that the first hash value matches the second hash value, changes the validity period identified by the position to a validity period input through the input device, changes the version information, and combines the components to reproduce the installation package.

5 Claims, 9 Drawing Sheets

SOFTWARE VALIDITY PERIOD CHANGING APPARATUS, METHOD, AND INSTALLATION PACKAGE

INCORPORATION BY REFERENCE

This application is based upon and claims the benefit of priority from corresponding Japanese Patent Application No. 2010-115866, filed in the Japan Patent Office on May 20, 2010, the entire contents of which is incorporated herein by reference.

BACKGROUND

1. Field

The present invention relates to an apparatus and a method for changing a software validity period, and to an installation package.

2. Description of the Related Art

If a registered password is located on a memory by an authentication program, the password may be stolen by spyware. Therefore, a hash value of a password is loaded onto the memory as a registration value. A password input by a user is converted into a hash value by a program, and the hash value is compared to the above-described registration value to perform authentication.

If the authentication is successful, an executable program is allowed to perform a specific process, for example, a process for changing a validity period of software.

Meanwhile, if an image forming apparatus is shipped in which an optional routine is prestored in a nonvolatile memory of the image forming apparatus, then at a time of trial use of the optional routine, a universal serial bus (USB) memory key is connected to the image forming apparatus to allow the trial use of the optional routine for a predetermined period.

The use of the optional routine is restricted for various reasons. For example, if an upgrade of hardware or firmware is scheduled for the image forming apparatus, this upgrade must concur with an upgrade of the optional routine. The trial use expires otherwise.

In the above-described case, a validity period of the optional routine is set separately from the trial period determined corresponding to the user. The validity period is adjusted corresponding to a timing of shipment of hardware or firmware, and in addition, the timing of shipment of hardware or firmware differs depending on the sales region. Therefore, it is difficult for a software developer to adjust the validity period.

In order to delegate the changing of the validity period to a dealer of the image forming apparatus, the software developer needs to pass a source code to the dealer and cause the dealer to change the validity period on the source code and recompile the source code. This means that the source code flows out from the software developer to the outside, which causes a fear of leakage of secrets.

Further, there is a method in which a program that enables the validity period to be changed via a user interface is loaded onto the image forming apparatus and the dealer activates the program to change the validity period. However, it is complicated to perform such a manual change individually to the image forming apparatuses.

SUMMARY

The present disclosure relates to an apparatus and a method for changing a software validity period included in an installation package, and to an installation package.

A software validity period changing apparatus according to one aspect of the present disclosure includes: a password information storage unit that stores a password; an input device; an authentication unit that calculates a first hash value of the password stored in the password information storage unit, calculates a second hash value of a password input via the input device, and determines whether or not the first hash value matches the second hash value; and a validity period changing unit that decompresses an installation package into a plurality of components, the installation package including a validity period and version information on each of the plurality of components. If the authentication unit determines that the first hash value matches the second hash value, the validity period changing unit detects a position of the validity period, changes the detected validity period to a validity period input via the input device, changes the version information, and combines the plurality of components to reproduce the installation package.

A software validity period changing method according to one aspect of the present disclosure includes: calculating a first hash value of a password stored in an installation package; calculating a second hash value of a password input via an input device; determining whether or not the first hash value matches the second hash value; decompressing the installation package into a plurality of components, the installation package including a validity period and version information on each of the plurality of components; detecting a position of the validity period in the each of the plurality of components if it is determined that the first hash value matches the second hash value; changing the detected validity period to a validity period input through the input device; changing the version information; and combining the plurality of components to reproduce the installation package.

An installation package according to one aspect of the present disclosure, which has a validity period changed on an apparatus, includes: a plurality of components; an installation processing information storage unit including version information on the component; a validity period information storage unit including a validity period; a password information storage unit that stores a password; and an authentication unit that calculates a first hash value of the password stored in the password information storage unit, calculates a second hash value of a password input through the apparatus, and determines whether or not the first hash value matches the second hash value. If the authentication unit determines that the first hash value matches the second hash value, a position of the validity period is detected, the detected validity period is changed to a validity period input via the apparatus, and the version information is changed.

Additional features and advantages are described herein, and will be apparent from the following Detailed Description and the figures.

DETAILED DESCRIPTION

Figure 1:
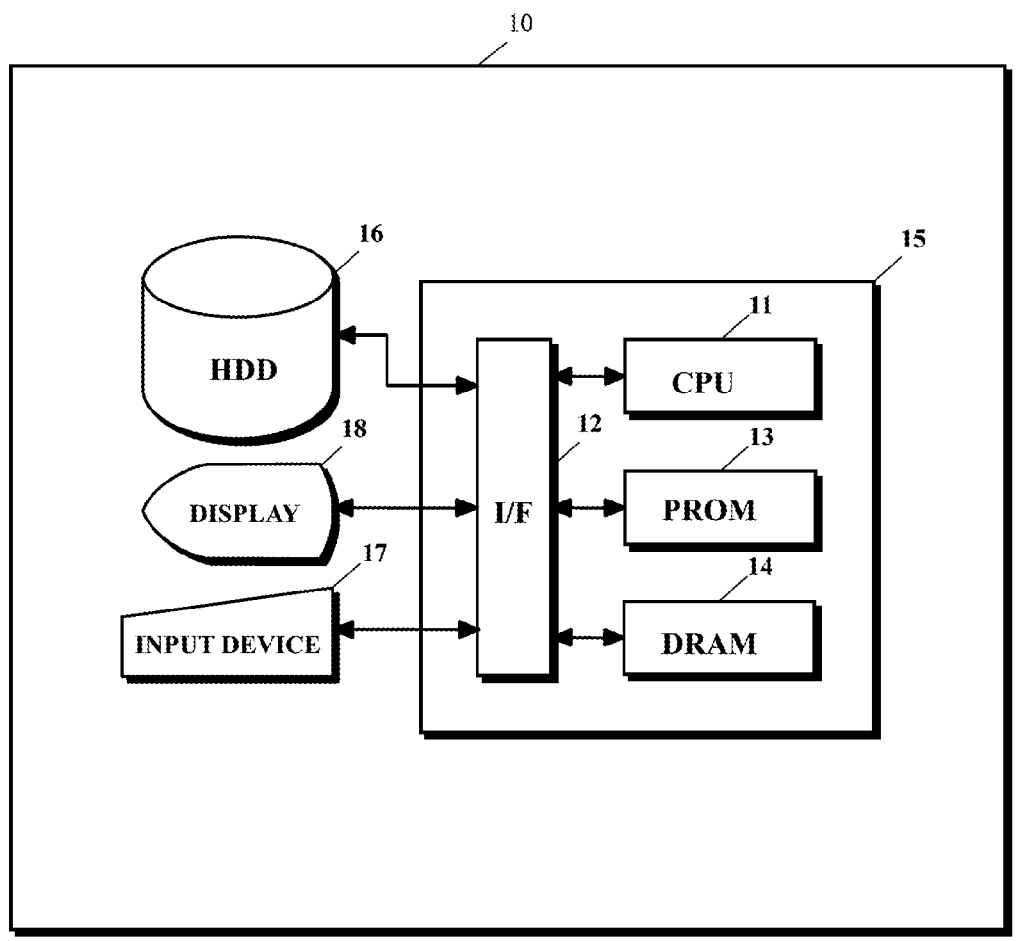
FIG. 1 shows a block diagram illustrating a hardware configuration of a software validity period changing apparatus.

FIG. 1 shows a block diagram illustrating a hardware configuration of a software validity period changing apparatus 10. The software validity period changing apparatus 10 is a typical terminal device, and includes a computer 15 in which a central processing unit (CPU) 11 is connected to a programmable read only memory (PROM) 13 and a dynamic random access memory (DRAM) 14 via an interface (I/F) 12, a hard disk drive (HDD) 16 connected to the I/F 12, an input device 17, and a display 18. For the sake of simplicity, a plurality of kinds of interfaces are expressed by one block 12.

The PROM 13 may be, for example, a flash memory, and includes a basic input/output system (BIOS). The DRAM 14 is used as a main memory device. An operating system (OS) of a virtual storage system, various drivers and applications, and data may be stored on the HDD 16.

Figure 2:
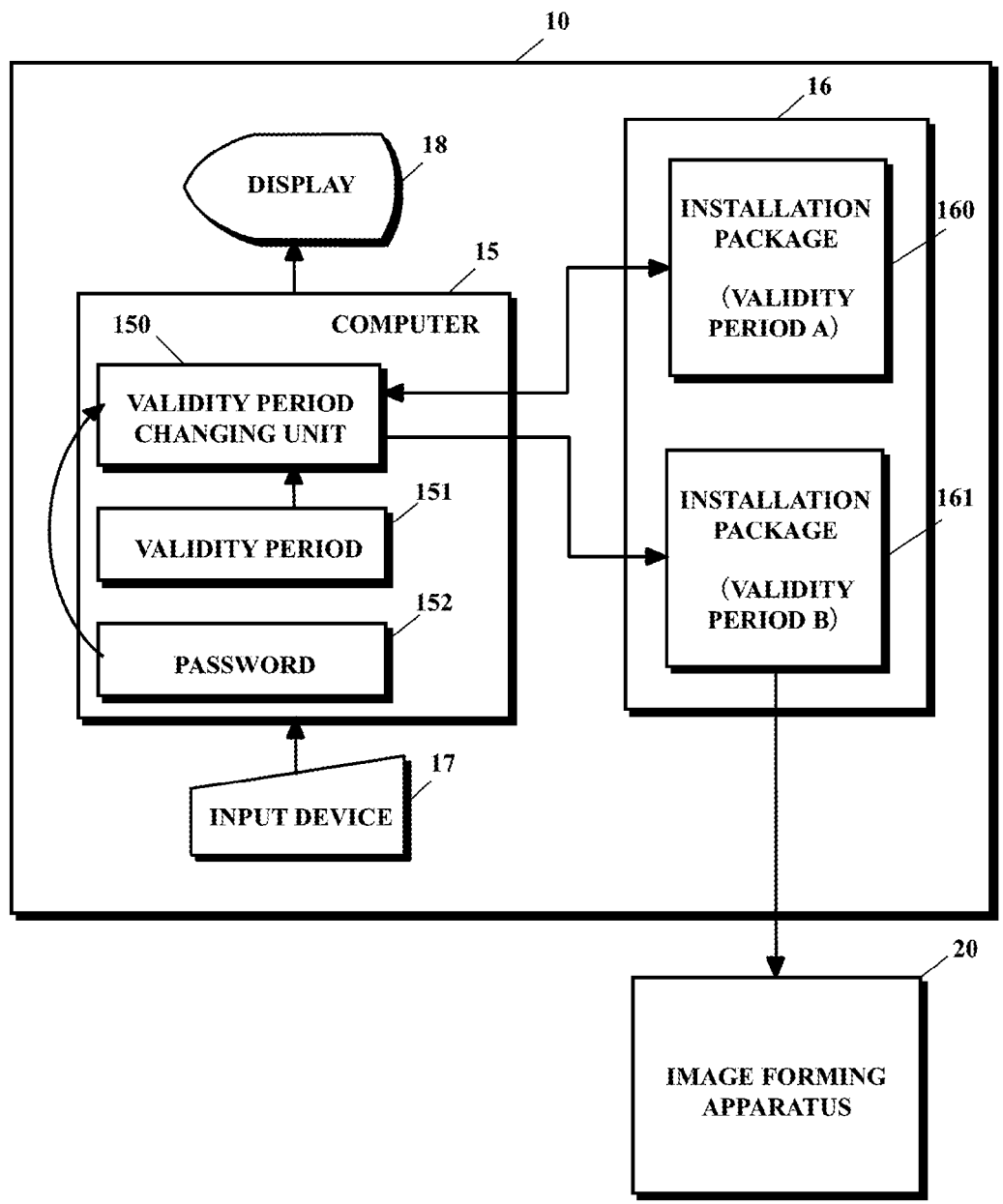
FIG. 2 shows a block diagram illustrating a functional configuration of the software validity period changing apparatus.

FIG. 2 shows a block diagram illustrating a functional configuration of the software validity period changing apparatus 10. The HDD 16 stores an installation package 160 having a validity period A as an object to be processed. The installation package 160 may be one file of, for example, JAR or MSI format (having extension ".jar" or ".msi," respectively) in which a plurality of compiled components are compressed and combined with one another. The computer 15 includes a validity period changing unit 150 that operates based on a collaboration between software and hardware.

After authentication information is input based on a display on the display 18 via the input device 17 and the authentication is successful, a new validity period and a new password are input to the computer 15. The validity period changing unit 150 converts the new validity period input via the input device 17 into a validity period 151 conforming to the format of a validity period included in the installation package 160, and converts the new password input via the input device 17 into a password 152 conforming to the format of a password included in the installation package 160. The validity period changing unit 150 reads the installation package 160 from the HDD 16 onto the DRAM 14, changes the validity period and the password in the installation package 160 to the validity period 151 and the password 152, respectively, reproduces an installation package 161 of the JAR or MSI format, and stores the installation package 161 on the HDD 16. The installation package 161 is duplicated and installed onto an image forming apparatus 20.

Figure 3:
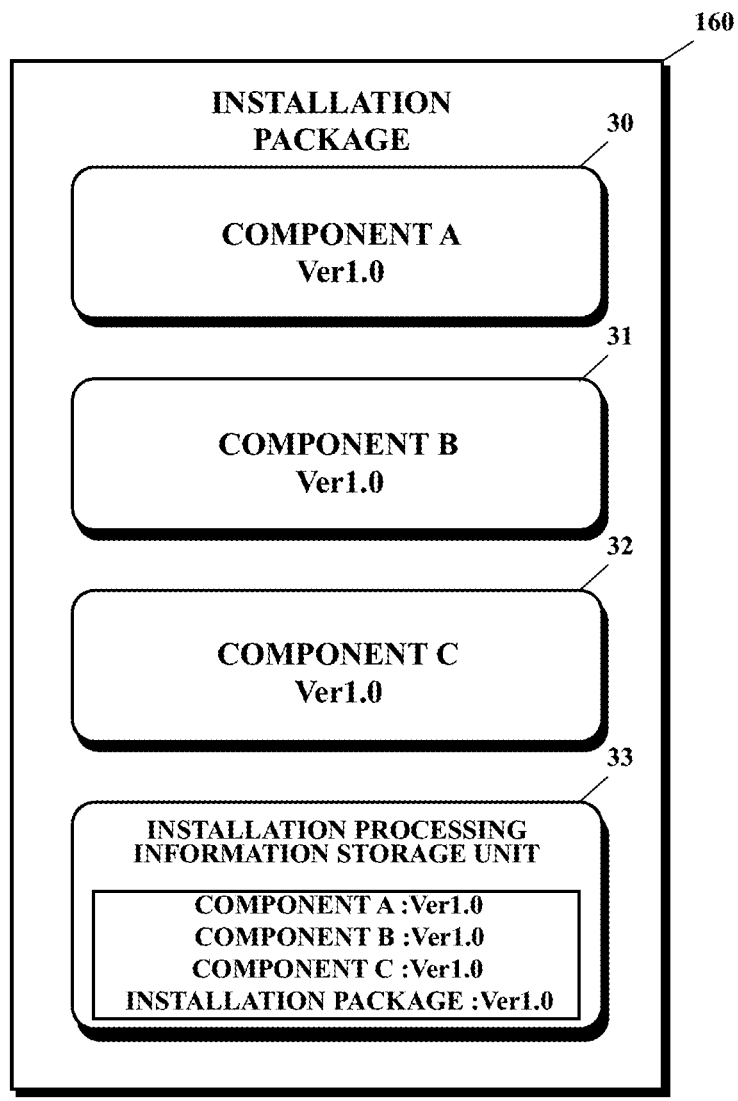
FIG. 3 shows a block diagram illustrating a configuration of an installation package.

FIG. 3 shows a block diagram illustrating a configuration of the installation package 160. The installation package 160 includes: a component A 30, a component B 31, and a component C 32 for implementing respective functions; and an installation processing information storage unit 33 that stores installation processing information used when an installer installs those components onto the image forming apparatus 20. For example, versions of the components A 30, B 31, and C 32 are each "1.0", and the installation processing information in the installation processing information storage unit 33 includes version information indicating that the components A 30, B 31, and C 32 are Version 1.0.

Figure 4:
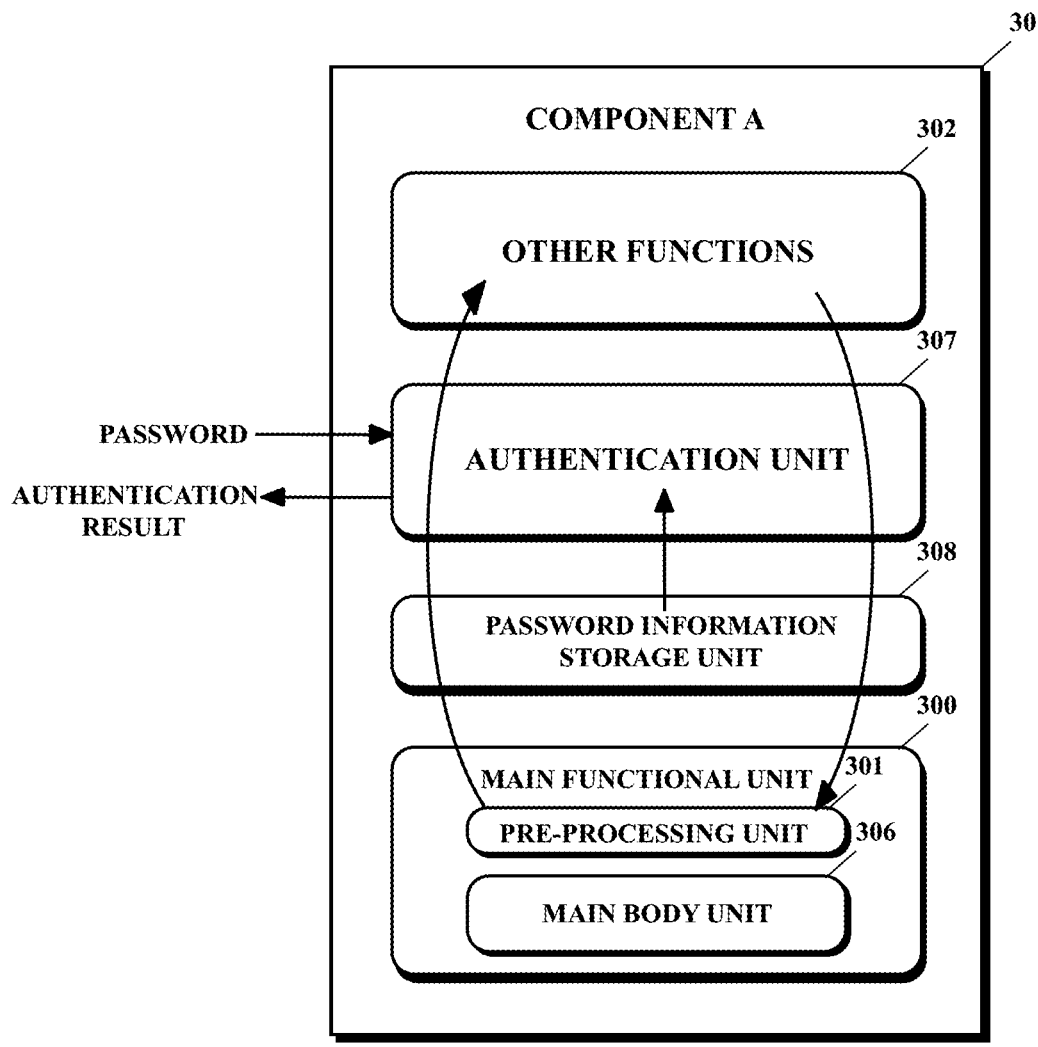
FIG. 4 shows a block diagram illustrating a configuration of a component A in the installation package.
Figure 5:
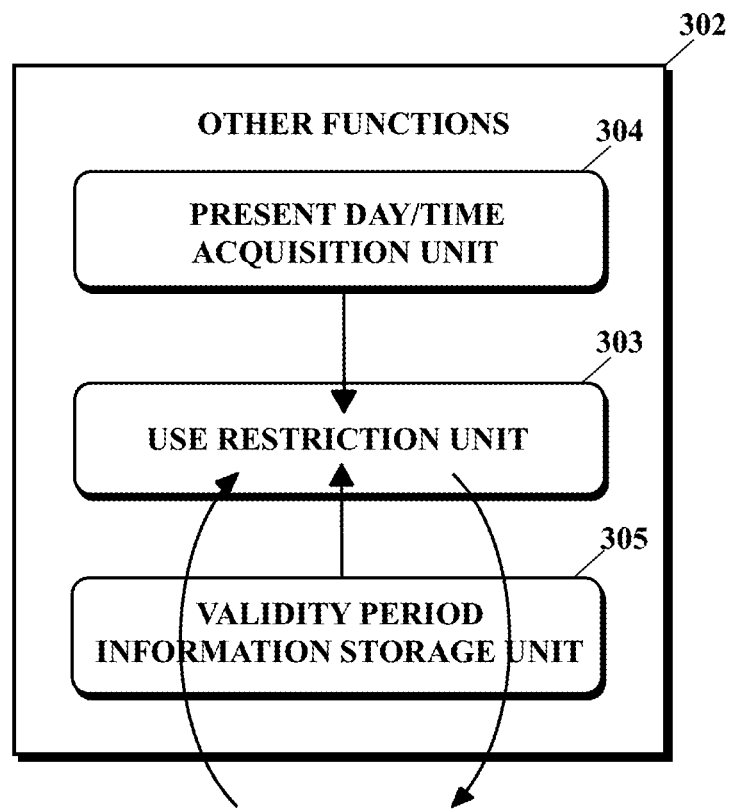
FIG. 5 shows a block diagram illustrating a configuration of other functions in the installation package.

FIG. 4 shows a block diagram illustrating a configuration of the component A 30 in the installation package 160 illustrated in FIG. 3. FIG. 5 shows a block diagram illustrating a configuration of other functions 302 of FIG. 4.

In the component A 30, when the installation package 160 is installed onto the image forming apparatus 20, a pre-processing unit 301 of a main functional unit 300 calls a use restriction unit 303 in the other functions 302. In response thereto, the use restriction unit 303 acquires a present date/time via a present date/time acquisition unit 304, and acquires the validity period from a validity period information storage unit 305. The use restriction unit 303 stops execution if the present date/time is outside the validity period. The use restriction unit 303 returns the control to the pre-processing unit 301 if the preset date/time is inside the validity period. The pre-processing unit 301 transfers the control to a main body unit 306, and the process of the main body unit 306 is executed.

It should be noted that at least one of the password information storage unit 308 and the authentication unit 307 included in the installation package 160 may be included in the validity period changing unit 150.

Figure 6:
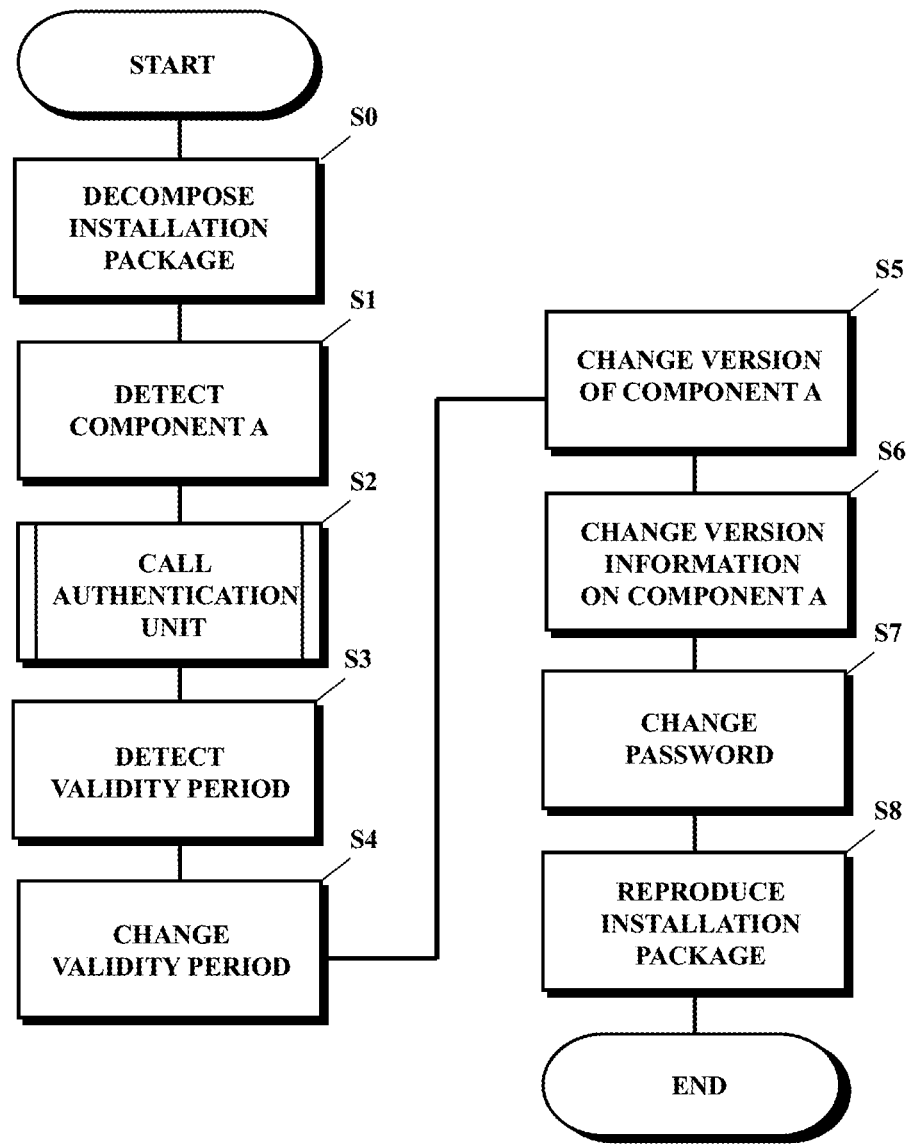
FIG. 6 shows a flowchart illustrating a process for changing a validity period of the component A.
Figure 7:
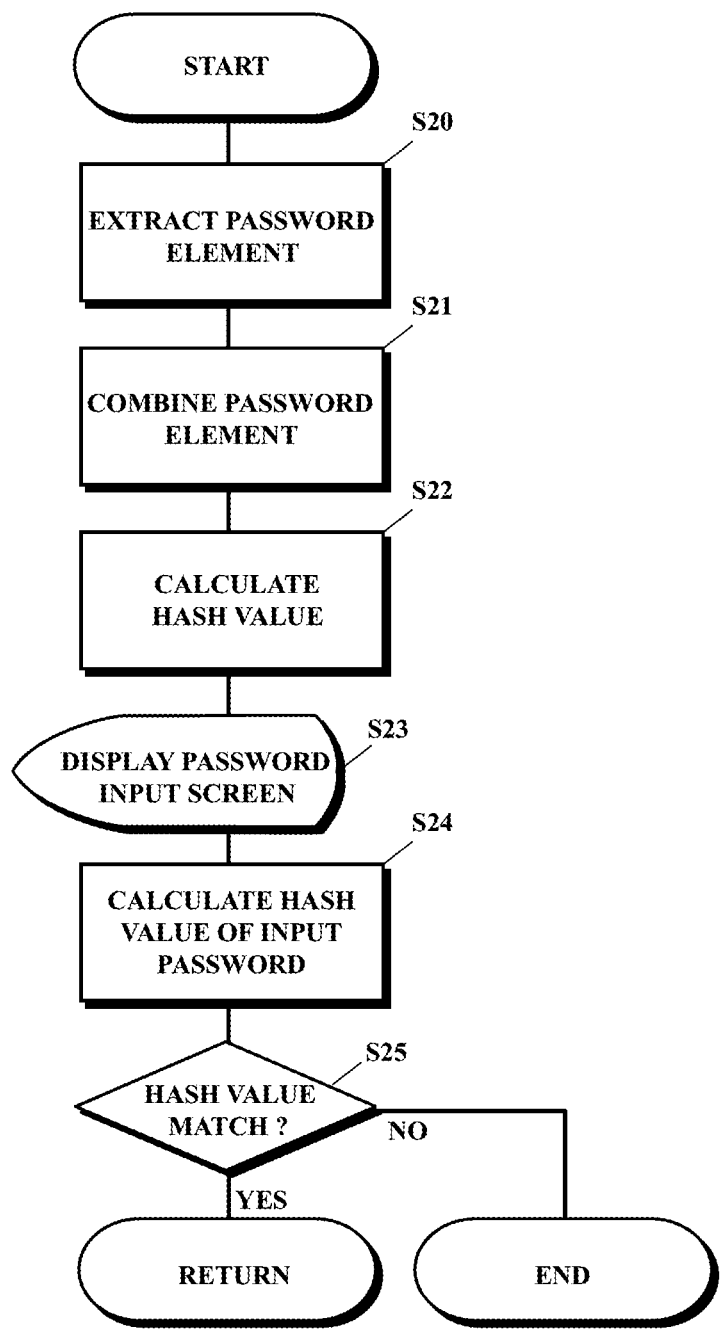
FIG. 7 shows a flowchart illustrating an authentication process.

FIG. 6 shows a flowchart illustrating a process performed by the validity period changing unit 150 to change the validity period in the validity period information storage unit 305 of the component A 30 to the validity period 151 after a successful authentication. FIG. 7 shows a flowchart illustrating an authentication process.

(S0) The installation package 160 is decompressed (expanded) on the DRAM 14. Termination identifiers of the component A 30, the component B 31, and the component C 32 appear.

(S1) An identifier (for example, a header identifier) of the predetermined component A 30 that includes the validity period, for example, "HyPAS_Comp_A" obtained by excluding a version identifier from "HyPAS_Comp_A.ver.20100101", is detected by being compared to a predetermined number of bytes (here, 12 bytes of "HyPAS_Comp_A") that are read by shifting one byte from the start to the end in the installation package 160. Then, a range of the component A 30 is defined from the header identifier to the termination identifier of the component A.

(S2) An authentication unit 307 in the component A 30 (which is a shared library) is called. With this operation, the authentication process illustrated in FIG. 7 is started.

(S20) The authentication unit 307 extracts password elements in a password information storage unit 308.

Figure 8:
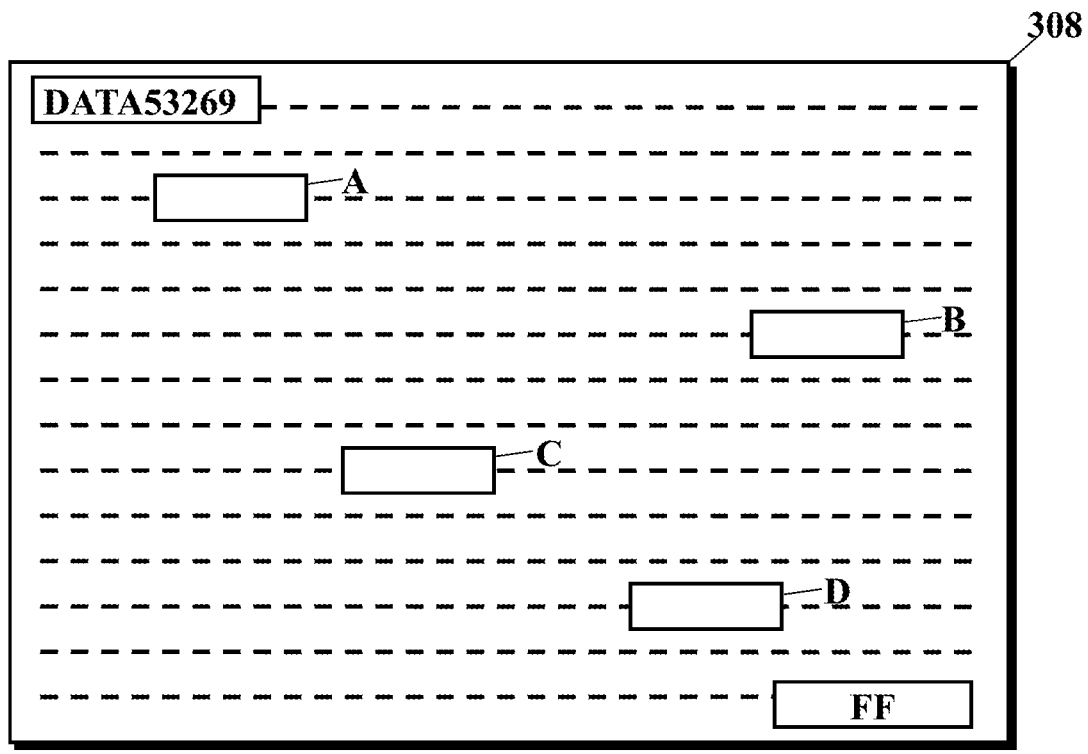
FIG. 8 shows a schematic diagram illustrating a structure of a password information storage unit.

FIG. 8 shows a schematic diagram illustrating a structure of the password information storage unit 308. To prevent password cracking, the password has been decomposed into a plurality of password elements A, B, C, and D and dispersed in the password information storage unit 308. The dotted line of FIG. 8 indicates dummy data. The password in the password information storage unit 308 is represented by a header ("DATA53269" of FIG. 8) indicating a reference position of the password elements A to D as a reference storage address and by byte arrays X(0) to X(1000) as relative addresses. The byte arrays are defined by, for example, indices (103, 205, 218, and 716) of an array element (X). The index represents the number of bytes from the header indicating the reference position. That is, X(103), X(205), X(218), and X(716) are extracted as the password components of the password elements A, B, C, and D, respectively, and the password component is a parameter indicating a location of the password element in the password information storage unit 308.

(S21) In FIG. 7, the extracted password elements are combined with one another to reproduce the password.

In FIG. 8, if the index of the array element is the termination identifier (for example, hexadecimal number "FF"), a group of password elements up to the previous index represents the password. For example, the password components of the password elements A to D are X(103), X(205), X(218), and X(716), respectively, X(797)="FF", and the group of password elements A+B+C+D represents the password.

It should be noted that, in the component A 30, the header of the password in the password information storage unit 308 is detected, and index values of the byte arrays, which serve as the relative addresses with respect to the header indicating the reference position as the reference storage address, are modified to change the password.

(S22) In FIG. 7, a hash value of the password in the password information storage unit 308 is calculated.

(S23) A password input screen is displayed on the display 18.

(S24) A hash value of the password input via the input device 17 is calculated.

(S25) If the hash value of the input password matches the hash value of the password in the password information storage unit 308, the control is returned to the validity period changing unit 150 (which is a caller of the authentication unit 307), and if the passwords do not match, the process of FIG. 7 is brought to an end.

(S3) In FIG. 6, a position of the validity period is detected on the basis of a header in the range of the component A 30, as described below.

In the same manner as the password illustrated in FIG. 8, the validity period may also be dispersed as a plurality of validity period elements A, B, C and D, and the validity period elements A, B, C and D may be combined with one another to reproduce the validity period. In this case, the header of the validity period information is "DATA53269" in the validity period information storage unit 305. Each of the validity period elements is located in the position apart from the header of the validity period information by a specified number of bytes.

(S4) In FIG. 6, the validity period in the component A 30 is overwritten by the validity period 151 input via the input device 17, and changed to the validity period 151.

(S5) The version identifier "ver.20100101", included in "HyPAS_Comp_A.ver.20100101" of the component A 30, is changed to, for example, "ver.20100101r", and the version of the component A 30 is also changed.

(S6) Corresponding to the changing of the version information, the version information on the component A 30 in the installation processing information storage unit 33 illustrated in FIG. 3 is changed in the same manner.

Figure 9:
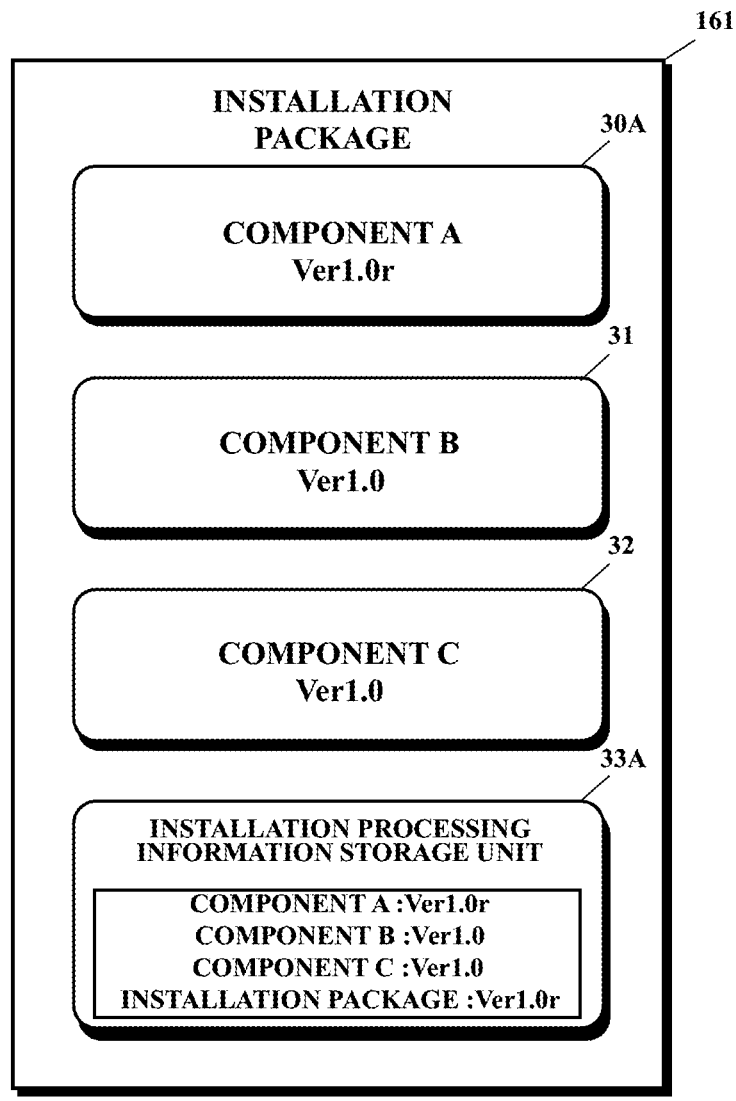
FIG. 9 shows a block diagram illustrating a configuration of the installation package after changing of the validity period.

FIG. 9 shows a block diagram illustrating a configuration of the installation package 161 after changing of the validity period. The version information indicating Version 1.0 (FIG. 3) of the component A 30 and the version information indicating Version 1.0 (FIG. 3) of the installation package 160 in the installation processing information storage unit 33 are changed to the version information indicating Version 1.0r of the component A 30A and the version information indicating Version 1.0r of the installation package 161, respectively.

(S7) In FIG. 6, in the same manner as the changing of the validity period in step S4, the password in the component A 30 is changed to the password 152 input via the input device 17.

(S8) On the installation package 160 in which the version information has been changed, a process (combining process) is performed to reverse the decompression (expansion) on the DRAM 14, and the installation package 161 illustrated in FIG. 9 is reproduced.

The installer decompresses the installation package 161 illustrated in FIG. 9 into the respective components, refers to the version information in an installation processing information storage unit 33 A, and continues the process if the version information in a package installed on the image forming apparatus 20 is older than the one in the installation processing information storage unit 33 A. Further, the installer changes the respective components included in the package on the image forming apparatus 20 to the corresponding components in the installation package 161 if the version information of the respective components is older than the one in the installation processing information storage unit 33 A. Accordingly, when the installation package 160 is installed on the image forming apparatus 20, the component A 30 is changed to the component A 30A and the validity period in the validity period information storage unit 305 is changed to the validity period 151 input via the input device 17.

According to the above-described embodiment, the password is decomposed into a plurality of password elements, and then the plurality of password elements are stored in the password information storage unit 308 in a dispersed state at the relative addresses with respect to the reference storage address of the header. Accordingly, the password stored in the password information storage unit 308 is changed without having the source code recompiled.

Further, the password components are extracted and combined with one another to reproduce the password, and the hash value of the password is authenticated by being compared to the hash value of the password input via the input device 17. This may result in ensuring security against spyware that attempts to crack the password.

Further, the validity period changing unit 150 provided separately from the authentication unit 307 calls the authentication unit 307 for authentication to be performed based on the hash value. If the authentication is successful, the process of the validity period changing unit 150 is executed. Further, the passwords that differ depending on the installation package are stored. Further, on an installation package basis, the password is decomposed into the password elements that are dispersed. This may result in further improving security.

Further, the installation package 160 is decompressed, and the position of the validity period is detected based on the header of the validity period information in the validity period information storage unit 305 in the component A 30. The validity period specified by the detected position of the validity period is changed to the validity period 151 input via the input device 17, the version of the component A 30 and the version information in the component A 30 included in the installation processing information storage unit 33 are changed, and the respective components are combined to reproduce the installation package 161. Accordingly, the validity period is changed without having the source code recompiled. Further, the validity periods are not manually changed after the software is installed. Specifically, a software developer does not offer the source code to a dealer, but the dealer may nevertheless change the validity period of the installation package 160. In addition, the installation package 161 whose validity period has been changed is copied and distributed, and this may eliminate the need to manually change the validity periods.

Further, the range in which the header of the validity period information is detected is restricted to the predetermined component A 30. This may result in preventing detection error of the header.

Further, when the validity period information storage unit 305 that stores the validity period exists outside the component of the installation package 160, there is a higher probability that malicious changing of the validity period is performed. In this embodiment, it is difficult to change the validity period because the validity period information storage unit 305 is included in the component A 30A.

The present disclosure of this embodiment includes various other embodiments. For example, other designs can be used in which the above-described components are each performed.

When the installation package 160 is used, the authentication unit 307 may be used, and the password may be stored in a component other than the password information storage unit 308.

Further, at least two password information storage units 308 may be dispersed in the installation package 160, and the password elements in the two or more password information storage units 308 may be combined to reproduce the password.

Further, in the above-described embodiment, the changing of the validity period of software is described, but the above-described embodiment is also applied to the changing of an expiry date of software.

Further, the installation package may be various kinds of software, for example, a plugin for a software development kit (SDK).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A software validity period changing apparatus, comprising:
   a password information storage unit configured to store, in a dispersed state, a plurality of password elements generated by decomposing a password to prevent password cracking;
   an input device;
   an authentication unit configured to
      reproduce the password by combining the plurality of password elements stored in the password information storage unit,
      calculate a first hash value of the password,
      calculate a second hash value of a password input via the input device, and
      determine whether or not the first hash value matches the second hash value; and
   a validity period changing unit configured to
      decompress an installation package into a plurality of components, the installation package, in which a plurality of compiled components are compressed and combined, comprising a validity period and version information on each of the plurality of components,
      detect a position of the validity period on the basis of a header in a predetermined component among the plurality of components, if the authentication unit determines that the first hash value matches the second hash value,
      change the detected validity period to a validity period input via the input device,
      change the version information, and
      combine the plurality of components to reproduce the installation package,
   wherein the plurality of password elements stored in the dispersed state are represented by a header indicating a reference position of the password elements as a reference storage address and by byte arrays as relative addresses, wherein each relative address corresponds to an offset from the reference storage address, and
   wherein the byte array is defined by an index of an array element, and the index represents the number of bytes from the header indicating the reference position.

2. The software validity period changing apparatus according to claim 1, wherein the validity period changing unit is configured to detect the predetermined component on the basis of an identifier of the predetermined component in the installation package.

3. A software validity period changing method, comprising:
   combining a plurality of password elements, wherein the password elements are generated by decomposing the password into the plurality of password elements and stored in a dispersed state to prevent password cracking;
   reproducing the password stored in the installation package;
   calculating a first hash value of a password stored in an installation package;
   calculating a second hash value of a password input via an input device;
   determining whether or not the first hash value matches the second hash value;
   decompressing the installation package into a plurality of components, the installation package, in which a plurality of compiled components are compressed and combined, comprising a validity period and version information;
   detecting a position of the validity period on the basis of a header in a predetermined component in a plurality of components, if it is determined that the first hash value matches the second hash value;
   changing the detected validity period to a validity period input via the input device;
   changing the version information; and
   combining the plurality of components to reproduce the installation package,
   wherein the plurality of password elements stored in the dispersed state are represented by a header indicating a reference position of the password elements as a reference storage address and by byte arrays as relative addresses, wherein each relative address corresponds to an offset from the reference storage address,
   wherein the byte array is defined by an index of an array element, and the index represents the number of bytes from the header indicating the reference position.

4. An installation package, which has a validity period changed on an apparatus, comprising:
   a plurality of components;
   an installation processing information storage unit comprising version information on each of the plurality of components;
   a validity period information storage unit comprising a validity period;
   a password information storage unit configured to store, in a dispersed state, a plurality of password elements generated by decomposing a password to prevent password cracking; and
   an authentication unit configured to
      reproduce the password by combining the plurality of password elements stored in the password information storage unit,
      calculate a first hash value of the password stored in the password information storage unit, calculate a second hash value of a password input via the apparatus, and determine whether or not the first hash value matches the second hash value, wherein, a position of the validity period is detected on the basis of a header in a predetermined component among the plurality of components, if the authentication unit determines that the first hash value matches the second hash value, the detected validity period is changed to a validity period input via the apparatus, and the version information is changed, wherein the plurality of password elements stored in the dispersed state are represented by a header indicating a reference position of the password elements as a reference storage address and by byte arrays as relative addresses, wherein each relative address corresponds to an offset from the reference storage address, and wherein the byte array is defined by an index of an array element, and the index represents the number of bytes from the header indicating the reference position.

5. The installation package according to claim 4, wherein the predetermined component is detected on the basis of an identifier of the predetermined component in the installation package.

\* \* \* \* \*